(12) United States Patent
Kibby et al.

(10) Patent No.: US 8,461,220 B2
(45) Date of Patent: *Jun. 11, 2013

(54) PROCESS AND SYSTEM FOR REDUCING THE OLEFIN CONTENT OF A FISCHER-TROPSCH PRODUCT STREAM

(75) Inventors: Charles L. Kibby, Benicia, CA (US); Robert J. Saxton, Pleasanton, CA (US); Kandaswamy Jothimurugesan, Hercules, CA (US); Tapan K. Das, Albany, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 393 days.

This patent is subject to a terminal disclaimer.

(21) Appl. No.: 12/797,773

(22) Filed: Jun. 10, 2010

(65) Prior Publication Data

US 2011/0306685 A1  Dec. 15, 2011

(51) Int. Cl.
C07C 27/10 (2006.01)

(52) U.S. Cl.
USPC .......... 518/713; 518/714; 518/715; 518/716; 518/721

(58) Field of Classification Search
USPC .......................... 518/713, 714, 715, 716, 721
See application file for complete search history.

(56) References Cited

U.S. PATENT DOCUMENTS

| | | | |
|---|---|---|---|
| 4,279,830 A | 7/1981 | Haag et al. | |
| 4,304,871 A | 12/1981 | Brennan et al. | |
| 4,617,288 A | 10/1986 | Bell et al. | |
| 4,624,968 A | 11/1986 | Kim et al. | |
| 6,225,359 B1 | 5/2001 | O'Rear et al. | |
| 6,472,441 B1 | 10/2002 | Kibby | |
| 6,702,937 B2 | 3/2004 | Johnson et al. | |
| 7,507,326 B2 | 3/2009 | Farshid et al. | |
| 2001/0027259 A1 | 10/2001 | Fujimoto et al. | |
| 2002/0146358 A1 | 10/2002 | Smith et al. | |

FOREIGN PATENT DOCUMENTS

| | | |
|---|---|---|
| WO | WO9404476 | 3/1994 |
| WO | WO2009031756 | 3/2009 |
| WO | WO2009051353 | 4/2009 |

OTHER PUBLICATIONS

Subiranas, Alba Mena et al., "Combining Fischer-Tropsch (FT) and Hydrocarbon Reactions under FT Reaction Conditions—Catalyst and Reactor Studies with Co or Fe and Pt/ZSM-5," International Journal of Chemical Reactor Engineering, 2007, pp. 1-15, 5, Article A78, The Berkeley Electronic Press.
Subiranas, Alba Mena et al., "Combining Fischer-Tropsch (FT) and Hydrocarbon Reactions under FT Reaction Conditions: Model Compound and Combined-Catalyst Studies," International Journal of Chemical Reactor Engineering, 2009, pp. 1-24, 7, Article A31, The Berkeley Electronic Press.
Liu, Zhong-Wen et al., "Formation of Isoparaffins through Pd/β Zeolite Application in Fischer-Tropsch Synthesis," Energy & Fuels, 2005, pp. 1790-1794, 19, American Chemical Society.
Liu, Zhong-Wen et al., "Selective production of iso-paraffins from syngas over Co/SiO2 and Pd/beta hybrid catalysts," Catalysis Communications, 2005, pp. 503-506, 6, Elsevier B.V.
Zhao, Tian-Sheng et al., "Selective Synthesis of Middle Isoparaffins via a Two-Stage Fischer-Tropsch Reaction: Activity Investigation for a Hybrid Catalyst," Ind. Eng. Chem. Res., 2005, pp. 769-775, vol. 44, No. 4, American Chemical Society.
Liu, Zhong-Wen et al., "Insights into a Multifunctional Hybrid Catalyst Composed of Co/SiO2 and Pd/Beta for Isoparaffin Production from Syngas," Ind. Eng. Chem. Res., 2005, pp. 7329-7336, 44, American Chemical Society.
Li, Xiachong et al., "Direct synthesis of middle iso-paraffins from synthesis gas," Catalysis Today, 2003, pp. 59-65, 84, Elsevier B.V.
Nam, Insung et al., "Production of Middle Distillate from Synthesis Gas in a Dual-bed Reactor Through Hydrocracking of Wax Over Mesoporous PD-Al2O3 Composite Catalyst," Catal Lett, 2009, pp. 192-197, 130, Springer Science+Business Media, LLC.
Liu, Zhong-Wen et al., "High performance Pd/beta catalyst for the production of gasoline-range iso-paraffins via a modified Fischer-Tropsch reaction," Applied Catalysis A: General, 2006, pp. 162-169, 300, Elsevier B.V.
Liu, Zhong-Wen et al., "Iso-paraffins synthesis from modified Fischer-Tropsch reaction—Insights into Pd/beta and Pt/beta catalysts," Catalysis Today, 2005, pp. 41-47, 104, Elsevier B.V.
Li, Xiaohong et al., "Synthesis of isoparaffins from synthesis gas," Studies in Surface Science and Catalysis, 2004, pp. 367-372, vol. 147, Elsevier B.V.
Liu, Zhong-Wen et al., "Selective Production of Iso-paraffins from Synthesis Gas over Co/SiO2 and Pd/beta Catalysts", 2004.
Liu, Zhong-Wen et al., "Selective Production of Gasoline-Ranged Isoparaffins Over Co/SiO2 and Metal/β Catalysts From SYNGAS," Prepr. Pap.-Am. Chem. Soc., 2004, pp. 717-718, 49.
A. De Klerk, "Can Fischer-Tropsch Syncrude Be Refined to On-Specification Diesel Fuel?" Energy Fuels 2009, 23, 4593-4604.
U.S. Appl. No. 12/478,204, "Process of Synthesis Gas Conversion to Liquid Fuels Using Synthesis Gas Conversion Catalyst and Noble Metal-Promoted Acidic Zeolite Hydrocracking-Hydroisomerization Catalyst," filed Jun. 4, 2009.
U.S. Appl. No. 12/343,534, "Zeolite Supported Cobalt Hybrid Fischer-Tropsch Catalyst" filed Dec. 24, 2008.
U.S. Appl. No. 12/621,385, "Process of Synthesis Gas Conversion O Liquid Fuels Using Mixture of Synthesis Gas Coversion Catalyst and Dual Functionality Catalyst," filed Nov. 18, 2009.
U.S. Appl. No. 12/622,972, "Zeolite Supported Cobalt Hybrid Fischer-Tropsch Catalyst," filed Nov. 20, 2009.
U.S. Appl. No. 12/780,672 "Process of Synthesis Gas Conversion to Liquid Hydrocarbon Mixtures Using Synthesis Gas Conversion Catalyst and Hydroisomerization Catalyst" filed May 14, 2010.
Gujar, A.C. et al., "Fischer-Tropsch synthesis and product upgrading over dual bed catalytic system," Conference Proceedings—2009 AIChE Annual Meeting, Dec. 1, 2009.
Lamprecht, D., "Hydrogenation of Fischer-Tropsch Synthetic Crude," Energy & Fuels (2007), 21, 2509-2513.
PCT/US2011/039851, International Search Report, mailing date Jun. 9, 2011, pp. 1-9.

Primary Examiner — Samantha Shterengarts
(74) Attorney, Agent, or Firm — Karen R. DiDomenicis; Richard Schulte (57) ABSTRACT

A method is provided for converting synthesis gas to liquid hydrocarbon mixtures useful as distillate fuel and/or lube base oil containing no greater than about 25 wt % olefins and containing no greater than about 5 wt % $C_{21+}$ normal paraffins. The synthesis gas is contacted with a synthesis gas conversion catalyst comprising a Fischer-Tropsch synthesis component and an acidic component in an upstream catalyst bed thereby producing a wax-free liquid containing a paraffin component and an olefin component. The olefin component is saturated by contacting the liquid with an olefin saturation catalyst in a downstream catalyst bed.

14 Claims, 2 Drawing Sheets

PROCESS AND SYSTEM FOR REDUCING THE OLEFIN CONTENT OF A FISCHER-TROPSCH PRODUCT STREAM

FIELD

The present invention relates to a process for converting synthesis gas to liquid hydrocarbon mixtures useful as distillate fuel and/or lube base oil, the process including contacting the synthesis gas with a catalyst thereby producing a liquid containing a paraffin component and an olefin component, and saturating the olefin component by contacting the liquid with a hydrogenation catalyst.

BACKGROUND

The majority of combustible liquid fuel used in the world today is derived from crude oil. However, there are several limitations to using crude oil as a fuel source. For example, crude oil is in limited supply.

Alternative sources for developing combustible liquid fuel are desirable. An abundant resource is natural gas. The conversion of natural gas to combustible liquid fuel typically involves a first step of converting the natural gas, which is mostly methane, to synthesis gas, or syngas, which is a mixture of carbon monoxide and hydrogen. Fischer-Tropsch synthesis is a known means for converting syngas to higher molecular weight hydrocarbon products. Fischer-Tropsch diesel has a very high cetane number and is effective in blends with conventional diesel to reduce $NO_x$ and particulates from diesel engines, allowing them to meet stricter emissions standards.

Fischer-Tropsch synthesis is often performed under conditions which produce a large quantity of $C_{21+}$ wax, also referred to herein as "Fischer-Tropsch wax," which must be hydroprocessed to provide distillate fuels. Often, the wax is hydrocracked to reduce the chain length, and then hydrotreated to reduce oxygenates and olefins to paraffins. Hydrocracking tends to reduce the chain length of all of the hydrocarbons in the feed. When the feed includes hydrocarbons that are already in a desired range, for example, the distillate fuel range, hydrocracking of these hydrocarbons is undesirable.

As disclosed in co-pending U.S. patent application Ser. No. 12/343,534, incorporated in its entirety by reference, a hybrid Fischer-Tropsch catalyst, also referred to herein as a hybrid synthesis gas conversion catalyst, is described which is capable of converting synthesis gas to a hydrocarbon mixture free of solid wax. One advantage of a process employing this catalyst is that the absence of a solid wax phase eliminates the need for separating, and hydrotreating and/or hydrocracking a waxy product in a separate reactor. As such the hydrocarbon product resulting from this improved process can, in theory, be blended with crude oil.

In practice, however, Fischer-Tropsch synthesis produces a large percentage of olefinic hydrocarbons. An olefinic hydrocarbon is defined as a hydrocarbon in which one or more double bonds exist within the molecule. Olefinic, or unsaturated, hydrocarbons have the potential to be disruptive to refining processes, creating problems including crude heater and preheat train fouling, storage instability and gum deposits. Furthermore, the hydrogenation of olefins, apart from diene saturation, is not practiced in crude oil refining. For this reason, synthetic hydrocarbon mixtures must be treated so as to substantially remove unsaturated hydrocarbons before being blended into crude oil.

It would be desirable to have a means for converting a synthesis gas to a hydrocarbon mixture free of solid wax with a low percentage of olefins.

SUMMARY

According to one embodiment, the invention relates to a process for converting synthesis gas to a hydrocarbon mixture comprising contacting a feed comprising a mixture of carbon monoxide and hydrogen with a synthesis gas conversion catalyst comprising a Fischer-Tropsch synthesis component and an acidic component in an upstream catalyst bed and an olefin saturation catalyst in a downstream catalyst bed, wherein an intermediate hydrocarbon mixture containing paraffins and olefins and containing no greater than about 5 wt % $C_{21+}$ normal paraffins is formed over the synthesis gas conversion catalyst, and wherein said olefins are saturated over the olefin saturation catalyst, thereby resulting in a final hydrocarbon mixture containing no greater than about 25 wt % olefins and containing no greater than about 5 wt % $C_{21+}$ normal paraffins.

DETAILED DESCRIPTION

Figure 1:
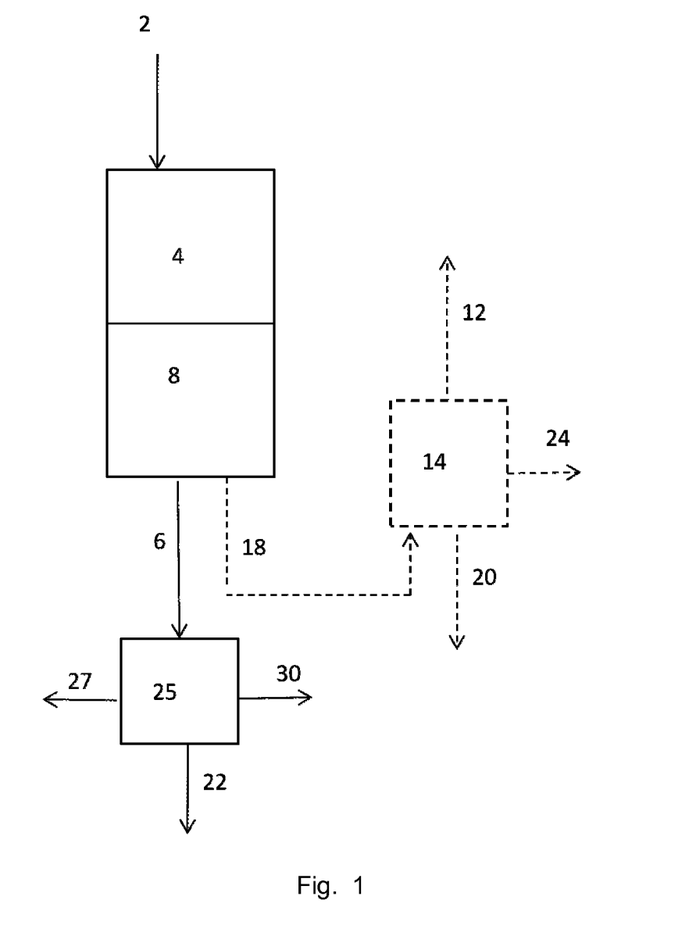
FIG. 1 is a schematic diagram illustrating a process for converting synthesis gas to liquid hydrocarbons according to an embodiment of the invention.

Referring to FIG. 1, according to one embodiment, a process is disclosed for the synthesis of liquid paraffins in the distillate fuel and/or lube base oil range by passing a feed of synthesis gas 2 over an upstream catalyst bed 4 and a downstream catalyst bed 8 in a single fixed bed reactor. Within a fixed bed reactor, multiple, small-diameter tubes are enclosed in a common cooling medium. An intermediate mixture of olefinic and paraffinic hydrocarbons is formed by contacting the synthesis gas with a synthesis gas conversion catalyst in the upstream catalyst bed 4. The hydrocarbon mixture so formed can range from methane to light wax, containing only trace amounts (<0.5 wt %) of carbon numbers above 30, and may include linear, branched and cyclic compounds. As defined herein, the terms "wax" and "solid wax" refer to $C_{21+}$ normal paraffins. The intermediate hydrocarbon mixture is then contacted with a hydrogenation catalyst, also referred to as an olefin saturation catalyst, in downstream catalyst bed 8. According to this embodiment, both the synthesis gas conversion and the subsequent olefin saturation are carried out in a single reactor under essentially common reaction conditions without having to provide a separate reactor for olefin saturation. By "essentially common reaction conditions" is meant that the temperature of the cooling medium within the reactor is constant from one point to another within a few degrees Celsius (e.g., 0-3° C.) and the pressure within the reactor is allowed to equilibrate between the two beds. Optionally, although not preferably, more than one cooling system may be used utilizing more than one cooling medium physically separated from each other, in which case the cooling media may be at differing temperatures. The temperatures and pressures of the upstream and downstream beds can differ somewhat, although advantageously it is not necessary to separately control the temperature and pressure of the two beds. The bed temperatures will depend on the relative exotherms of the reactions proceeding within them. Exotherms generated by synthesis gas conversion are greater than those generated by olefin saturation, so the average upstream bed temperature will generally be higher than the average downstream bed temperature. The temperature difference between the beds will depend on various reactor design factors, including but not limited to the temperature of the cooling medium, the diameter of the tubes in the reactor, and the rate of gas flow through the reactor. For adequate thermal control, the temperatures of the two beds are preferably maintained within about 10° C. of the cooling medium temperature, and therefore the difference in temperature between the upstream and downstream beds is preferably less than about 20° C., even less than about 10° C. The pressure at the end of the upstream bed is equal to the pressure at the beginning of the downstream bed since the two beds are open to one another. Note that there will be a pressure drop from the top of the upstream bed to the bottom of the downstream bed because gas is being forced through narrow tubes within the reactor. The pressure drop across the reactor could be as high as about 50 psi (about 3.4 atm), therefore the average difference in pressure between the beds could be up to about 25 psi (about 1.7 atm). According to this embodiment, the upstream and downstream catalyst beds are arranged in series, in a stacked bed configuration.

A feed of synthesis gas 2 is introduced to the reactor via an inlet (not shown). The ratio of hydrogen to carbon monoxide of the feed gas is generally high enough that productivity and carbon utilization are not negatively impacted by not adding hydrogen in addition to the hydrogen of the syngas into the reactor or producing additional hydrogen using water-gas shift. The ratio of hydrogen to carbon monoxide of the feed gas is also generally below a level at which excessive methane would be produced. Advantageously, the ratio of hydrogen to carbon monoxide is between about 1.0 and about 2.2, even between about 1.5 and about 2.2. If desired, pure synthesis gas can be employed or, alternatively, an inert diluent, such as nitrogen, $CO_2$, methane, steam or the like can be added. The phrase "inert diluent" indicates that the diluent is non-reactive under the reaction conditions or is a normal reaction product. It is usually advantageous to operate the syngas conversion process in a partial conversion mode, for instance 50-60 wt % based on CO, and to condense the liquid products, especially water, before either recycling the dry tail gas or sending it to an additional reactor stage.

Intermediate mixture 6 exiting downstream catalyst bed 8 is directed to a separator 25 which utilizes a drop in temperature to condense water 22 and separate product stream 30 and gas stream 27. Gas stream 27 can be disposed of in any convenient manner, including, but not limited to, recycling to the upstream bed via a compressor (not shown). Alternatively, gas stream 27 can be sent to a syngas generation unit, e.g. an autothermal reformer (not shown), or flared (not shown).

Optionally, recycle stream 18 is passed through separator 14 which utilizes a drop in temperature to condense water 20 and separate product stream 24 and gas stream 12. Product stream 24 is recycled to the upstream bed. As described above, gas stream 12 is recycled to the upstream bed via a compressor (not shown); a portion of gas stream 12 is optionally sent to a syngas generation unit, e.g. an autothermal reformer (not shown) or flared (not shown) in order to reduce the unconverted gas content recycled to the upstream bed.

The feed gas initially contacts a synthesis gas conversion catalyst in the upstream bed 4 of the reactor.

According to one embodiment, the synthesis gas conversion catalyst is a hybrid synthesis gas conversion catalyst containing a synthesis gas conversion catalyst in combination with an olefin isomerization catalyst, for example a relatively acidic zeolite, for isomerizing double bonds in $C_{4+}$ olefins as they are formed. Methods for preparing a hybrid catalyst of this type are described in co-pending U.S. patent application Ser. No. 12/343,534, incorporated herein in its entirety by reference. Co-pending U.S. patent application Ser. No. 12/343,534 describes a method comprises impregnating a zeolite extrudate using a solution comprising a cobalt salt to provide an impregnated zeolite extrudate and activating the impregnated zeolite extrudate by a reduction-oxidation-reduction cycle. According to the present process, the Fischer-Tropsch component (also referred to as "FT component" or "FT metal") is not necessarily cobalt, but may also comprise ruthenium, iron or mixtures including cobalt, iron or ruthenium. Impregnation of a zeolite using a substantially non-aqueous solution comprising an FT metal salt and a salt of a metal promoter, if desired, followed by activation by a reduction-oxidation-reduction cycle reduces ion-exchange with zeolite acid sites, thereby increasing the overall activity of the zeolite component. The resulting catalyst comprises FT metal distributed as small crystallites upon the zeolite support. The zeolite support, impregnation method and reduction-oxidation-reduction cycle used to activate the catalyst are described in detail below.

The use of zeolite extrudates as the zeolite support is beneficial, for the relatively larger zeolite extrudate particles result in lower pressure drop and are subject to less attrition than zeolite powder or even granular zeolite (e.g., having a particle size of about 300-1000 μm). Methods of formation of zeolite extrudates are readily known to those of ordinary skill in the art. Wide variations in macroporosity are possible with such extrudates. For the hybrid synthesis gas conversion catalyst, without wishing to be bound by theory, it is believed that as high a macroporosity as possible, consistent with high enough crush strength to enable operation in long reactor tubes, will be advantageous in minimizing diffusion constraints on activity and selectivity.

A zeolite support is a molecular sieve that contains silica in the tetrahedral framework positions. Examples include, but are not limited to, silica-only (silicates), silica-alumina (aluminosilicates), silica-boron (borosilicates), silica-germanium (germanosilicates), alumina-germanium, silica-gallium (gallosilicates) and silica-titania (titanosilicates), and mixtures thereof.

Molecular sieves, in turn, are crystalline materials that have regular passages (pores). If examined over several unit cells of the structure, the pores will form an axis based on the same units in the repeating crystalline structure. While the overall path of the pore will be aligned with the pore axis, within a unit cell, the pore may diverge from the axis, and it may expand in size (to form cages) or narrow. The axis of the pore is frequently parallel with one of the axes of the crystal. The narrowest position along a pore is the pore mouth. The pore size refers to the size of the pore mouth. The pore size is calculated by counting the number of tetrahedral positions that form the perimeter of the pore mouth. A pore that has 10 tetrahedral positions in its pore mouth is commonly called a 10-ring pore. Pores of relevance to catalysis in this application have pore sizes of 8 rings or greater. If a molecular sieve has only one type of relevant pore with an axis in the same orientation to the crystal structure, it is called 1-dimensional. Molecular sieves may have pores of different structures or may have pores with the same structure but oriented in more than one axis related to the crystal. In these cases, the dimensionality of the molecular sieve is determined by summing the number of relevant pores with the same structure but different axes with the number of relevant pores of different shape.

Exemplary zeolite supports of the hybrid synthesis gas conversion catalyst include, but are not limited to, those designated SSZ-13, SSZ-33, SSZ-46, SSZ-53, SSZ-55, SSZ-57, SSZ-58, SSZ-59, SSZ-64, ZSM-5, ZSM-11, ZSM-12, TS-1, MTT (e.g., SSZ-32, ZSM-23 and the like), H—Y, BEA (zeolite Beta), SSZ-60 and SSZ-70. These molecular sieves each contain silicon as the major tetrahedral element, have 8 to 12 ring pores, and are microporous molecular sieves, meaning having pore mouths of 20 rings or less.

The zeolite supports can have an external surface area of between about 100 m$^2$/g and about 300 m$^2$/g, for example, about 180 m$^2$/g. Micropore volumes for 80% ZSM-5 are between about 90 and 112 µL/g, with lower volumes implying some occlusion or loss of micropore structure. BET surface area is a sum of external area and micropore area. The zeolite supports can further have porosity of between about 30 and 80%, total intrusion volume of between about 0.25 and 0.60 cc/g, and crush strength of between about 1.25 and 5 lb/mm. Si/Al ratio of zeolite component only can be between about 10 and 100.

Initially, the zeolite support can be treated by oxidative calcination at a temperature in the range of from about 450° to about 900° C., for example, from about 600° to about 750° C. to remove water and any organics from the zeolite support.

Meanwhile, a non-aqueous organic solvent solution of a FT component salt, and, if desired, aqueous or non-aqueous organic solvent solutions of metal promoter salts, for example, are prepared. Any suitable salt, such as nitrate, chloride, acetate or the like can be used. Aqueous solutions for the promoters can be used in very small amounts. As used herein, the phrase "substantially non-aqueous" refers to a solution that includes at least 95 volume % non-aqueous solution. In general, any metal salt which is soluble in the organic solvent and will not have a poisonous effect on the catalyst can be utilized. The non-aqueous organic solvent is a non-acidic liquid which is formed from moieties selected from the group consisting of carbon, oxygen, hydrogen and nitrogen, and possesses a relative volatility of at least 0.1. The phrase "relative volatility" refers to the ratio of the vapor pressure of the solvent to the vapor pressure of acetone, as reference, when measured at 25° C. Suitable solvents include, for example, ketones, such as acetone, butanone (methyl ethyl ketone); the lower alcohols, e.g., methanol, ethanol, propanol and the like; amides, such as dimethyl formamide; amines, such as butylamine; ethers, such as diethylether and tetrahydrofuran; hydrocarbons, such as pentane and hexane; and mixtures of the foregoing solvents. Suitable cobalt salts include, for example, cobalt nitrate, cobalt acetate, cobalt carbonyl, cobalt acetylacetonate, or the like. Likewise, any suitable ruthenium salt, such as ruthenium nitrate, chloride, acetate or the like can be used. In an embodiment, ruthenium acetylacetonate is used. In general, any metal salt which is soluble in the organic solvent and will not have a poisonous effect on the metal catalyst or on the acid sites of the zeolite can be utilized.

The calcined zeolite support is then impregnated in a dehydrated state with the substantially non-aqueous, organic solvent solution of the metal salts. Thus, the calcined zeolite support should not be unduly exposed to atmospheric humidity so as to become rehydrated. Any suitable impregnation technique can be employed including techniques well known to those skilled in the art so as to distend the catalytic metals in a uniform thin layer on the catalyst zeolite support. For example, the FT component and promoter can be deposited on the zeolite support material by the "incipient wetness" technique. Such technique is well known and requires that the volume of substantially non-aqueous solution be predetermined so as to provide the minimum volume which will just wet the entire surface of the zeolite support, with no excess liquid. Alternatively, the excess solution technique can be utilized if desired. If the excess solution technique is utilized, then the excess solvent present, e.g., acetone, is merely removed by evaporation. Multiple impregnations are often needed to achieve the desired metal loading, with intervening drying and calcination treatments to disperse and decompose the metal salts. The FT component content can be varied from about 0.5 weight % to about 25 weight %.

A promoter metal may be included in the hybrid synthesis gas conversion catalyst if desired. For example, when the FT component is cobalt, suitable promoters include, for example, ruthenium, platinum, palladium, silver, gold, rhenium, manganese and copper. When the FT component is ruthenium, suitable promoters include, for example, rhenium, platinum, palladium, silver, gold, manganese and copper. As an example, for a catalyst containing about 10 weight % cobalt, the amount of ruthenium promoter can be from about 0.01 to about 0.50 weight %, for example, from about 0.05 to about 0.25 weight % based upon total catalyst weight. The amount of ruthenium would accordingly be proportionately higher or lower for higher or lower cobalt levels, respectively. A catalyst level of about 10 weight % has been found to best for 80 weight % ZSM-5 and 20 weight % alumina. The amount of cobalt can be increased as amount of alumina increases, up to about 20 weight % Co.

Next, the substantially non-aqueous solution and zeolite support are stirred while evaporating the solvent at a temperature of from about 25° to about 50° C. until "dryness." The impregnated catalyst is slowly dried at a temperature of from about 110° to about 120° C. for a period of about 1 hour so as to spread the metals over the entire zeolite support. The drying step is conducted at a very slow rate in air.

The dried catalyst may be reduced directly in hydrogen or it may be calcined first. The dried catalyst is calcined by heating slowly in flowing air, for example 10 cc/gram/minute, to a temperature in the range of from about 200° to about 350° C., for example, from about 250° to about 300° C., that is sufficient to decompose the metal salts and fix the metals. The aforesaid drying and calcination steps can be done separately or can be combined. However, calcination should be conducted by using a slow heating rate of, for example, 0.5° to about 3° C. per minute or from about 0.5° to about 1° C. per minute and the catalyst should be held at the maximum temperature for a period of about 1 to about 20 hours, for example, for about 2 hours.

The foregoing impregnation steps are repeated with additional substantially non-aqueous solutions in order to obtain the desired metal loading. Metal promoters can be added with the FT component, but they may be added in other impregnation steps, separately or in combination, before, after or between impregnations of FT component.

After the last impregnation sequence, the loaded catalyst zeolite support is then subjected to the ROR activation treatment comprising the steps, in sequence, of (A) reduction in hydrogen, (B) oxidation in an oxygen-containing gas, and (C) reduction in hydrogen, the activation procedure being conducted at a temperature below 500° C., even below 450° C., even below 400° C., even below 300° C., depending on the FT component being used. Temperatures between 100° and 450° C., even between 250° and 400° C., are suitable for the reduction steps. The oxidation step is between 200° and 300° C. These activation steps are conducted while heating at a rate of from about 0.1° to about 5° C., for example, from about 0.1° to about 2° C. It has been found that the activation procedure provides a catalyst with improved reaction rates when the catalyst is prepared by impregnation of a zeolite support with an FT component such as cobalt or ruthenium. Moreover, the activation procedure can significantly improve the activity of the catalyst when a promoter has been previously added.

The ROR activation procedure of the present disclosure is now described in more detail. The impregnated catalyst can be slowly reduced in the presence of hydrogen. If the catalyst has been calcined after each impregnation, to decompose nitrates or other salts, then the reduction may be performed in one step, after an inert gas purge, with heating in a single temperature ramp (e.g., 1° C./min.) to the maximum temperature and held at that temperature, from about 250° or 300° to about 450° C., for example, from about 350° to about 400° C., for a hold time of 6 to about 65 hours, for example, from about 16 to about 24 hours. Pure hydrogen is preferred in the first reduction step. If nitrates are still present, the reduction can be conducted in two steps wherein the first reduction heating step is carried out at a slow heating rate of no more than about 5° C. per minute, for example, from about 0.1° to about 1° C. per minute up to a maximum hold temperature of 200° to about 300° C., for example, 200° to about 250° C., for a hold time of from about 6 to about 24 hours, for example, from about 16 to about 24 hours under ambient pressure conditions. In the second treating step of the first reduction, the catalyst can be heated at from about 0.5° to about 3° C. per minute, for example, from about 0.1° to about 1° C. per minute to a maximum hold temperature of from about 250° or 300° up to about 450° C., for example, from about 350° to about 400° C. for a hold time of 6 to about 65 hours, for example, from about 16 to about 24 hours. Although pure hydrogen is preferred for these reduction steps, a mixture of hydrogen and nitrogen can be utilized.

The reduction may involve the use of a mixture of hydrogen and nitrogen at 100° C. for about one hour; increasing the temperature 0.5° C. per minute until a temperature of 200° C.; holding that temperature for approximately 30 minutes; and then increasing the temperature 1° C. per minute until a temperature of 350° C. is reached and then continuing the reduction for approximately 16 hours. Reduction should be conducted slowly enough and the flow of the reducing gas maintained high enough to maintain the partial pressure of water in the off-gas below 1%. Before and after all reductions, the catalyst is purged in an inert gas such as nitrogen, argon or helium.

The reduced catalyst is passivated at ambient temperature (25°-35° C.) by flowing diluted air over the catalyst slowly enough so that a controlled exotherm of no larger than +50° C. passes through the catalyst bed. After passivation, the catalyst is heated slowly in diluted air to a temperature of from about 300° to about 350° C. (preferably 300° C.) in the same manner as previously described in connection with calcination of the catalyst.

Next, the reoxidized catalyst is then slowly reduced again in the presence of hydrogen, in the same manner as previously described in connection with the initial reduction of the impregnated catalyst. This reduction may be accomplished in a single temperature ramp and held, as described above, for reduction of calcined catalysts.

While the ROR activation procedure of the present disclosure may be used to improve activity of the hybrid synthesis gas conversion catalyst of the present disclosure, any technique well known to those having ordinary skill in the art to distend the catalytic metals in a uniform manner on the catalyst zeolite support is suitable, provided they do not promote ion exchange with zeolite acid sites.

The hybrid synthesis gas conversion catalyst has an average particle diameter of from about 0.01 to about 6 millimeters; for example, from about 1 to about 6 millimeters.

According to an alternative embodiment, the synthesis gas conversion catalyst in the upstream catalyst bed 4 is not a hybrid synthesis gas conversion catalyst, but rather a mixture of a Fischer-Tropsch synthesis gas conversion catalyst and a separate dual functionality catalyst, for example a relatively acidic zeolite, for isomerizing double bonds in C4+ olefins as they are formed. The Fischer-Tropsch synthesis gas conversion catalyst includes a Fischer-Tropsch catalyst component on a support. The FT component can be cobalt, ruthenium, or iron. The support can include a solid oxide including but not limited to alumina, silica, titania or mixtures thereof.

The Fischer-Tropsch synthesis gas conversion catalyst can optionally include a promoter. For example, when the FT component is cobalt, suitable promoters include, for example, ruthenium, platinum, palladium, silver, gold, rhenium, manganese and copper. When the FT component is ruthenium, suitable promoters include, for example, rhenium, platinum, palladium, silver, gold, manganese and copper. As an example, for a catalyst containing about 10 weight % cobalt, the amount of ruthenium promoter can be from about 0.01 to about 0.50 weight %, for example, from about 0.05 to about 0.25 weight % based upon total catalyst weight. The amount of ruthenium would accordingly be proportionately higher or lower for higher or lower cobalt levels, respectively. A catalyst level of about 10 weight % has been found to best for 80 weight % ZSM-5 and 20 weight % alumina. The amount of cobalt can be increased as amount of alumina increases, up to about 20 weight % Co.

When the FT component is cobalt and a ruthenium promoter is used, the reduction-oxidation-reduction cycle used to activate the catalyst includes a first reduction step at a temperature in a range of about 200° to about 350° C. in order to avoid formation of cobalt aluminate (or cobalt silicate when a silica support is used). If unpromoted cobalt is used, this first reduction temperature can be increased to 400° C. to ensure full reduction. Following the first reduction step, an oxidation step at a temperature in a range of about 250° to about 300° C. is conducted, followed by a second reduction step at a temperature in a range of about 200° to about 350° C. The Fischer-Tropsch synthesis gas conversion catalyst has an average particle diameter from about 1 to about 6 millimeters, even from about 1 to about 3 millimeters. The lower limits on particle size are determined by the maximum allowable pressure drops through the reactor and the strength of the particles.

The dual functionality catalyst includes a hydrogenation component and a solid acid component. When the FT component is cobalt, the weight ratio of solid acid component to cobalt is between about 5 and about 50. The dual functionality catalyst includes a hydrogenation catalyst for hydrogenating olefins and a solid acid catalyst component for isomerizing and/or cracking the straight chain hydrocarbons. The hydrogenation component is typically a metal or combination of metals selected from Group VIII noble and non-noble metals and Group VIB metals. Preferred noble metals include platinum, palladium, rhodium and iridium. Non-noble metals which can be used include molybdenum, tungsten, cobalt, etc. The non-noble metal hydrogenation metals can be present in the final catalyst composition as oxides, when such compounds are readily formed from the particular metal involved. Preferred non-noble metal overall catalyst compositions contain in excess of about 5 weight percent, preferably about 5 to about 40 weight percent molybdenum and/or tungsten, and at least about 0.5, and generally about 1 to about 15 weight percent of cobalt determined as the corresponding oxides. The hydrogenation component can be incorporated into the overall catalyst composition by any one of numerous procedures. It can be added either to the acid component, to the support or a combination of both. These components can be added as a metal salt which can be thermally converted to the corresponding oxide in an oxidizing atmosphere or reduced to the metal with hydrogen or other reducing agent.

The solid acid component of the dual functionality catalyst can be a material such as amorphous silica-alumina or tungstated zirconia or a zeolitic or non-zeolitic crystalline molecular sieve. The molecular sieve can be a medium pore molecular sieve, by which is meant herein molecular sieves having an average pore diameter of between about 0.5 nm and about 0.7 nm. Examples of suitable molecular sieves include zeolites ZSM-5, ZSM-11, ZSM-12, ZSM-23, ZSM-57, NU-87, ZSM-48, TON type zeolites, ferrierite, and TNU-9. Small and large pore zeolites can alternatively be used. Non-zeolitic molecular sieves which can be used include, for example silicoaluminophosphates (SAPO), ferroaluminophosphate, titanium aluminophosphate and the various ELAPO molecular sieves described in U.S. Pat. No. 4,913,799 and the references cited therein. Details regarding the preparation of various non-zeolite molecular sieves can be found in U.S. Pat. No. 5,114,563 (SAPO); U.S. Pat. No. 4,913,799 and the various references cited in U.S. Pat. No. 4,913,799, the disclosure of which is hereby incorporated by reference in their entirety. Mesoporous molecular sieves can also be included, for example the M41S family of materials (J. Am. Chem. Soc. 1992, 114, 10834-10843), MCM-41 (U.S. Pat. Nos. 5,246,689, 5,198,203, 5,334,368), and MCM48 (Kresge et al., Nature 359 (1992) 710).

The Fischer-Tropsch synthesis gas conversion catalyst particles and the dual functionality catalyst particles are mixed uniformly, meaning there is no segregation between the two particle types. Within the upstream catalyst bed 4, the hydrocarbon chains do not build up into the wax range (C21+ normal paraffins). The relative amounts of catalysts in the catalyst mixture can be suitably varied to obtain the desired product. If the ratio of syngas conversion catalyst to dual functionality catalyst is too low, the hydrocarbon synthesis productivity will be low; whereas if this ratio is too high, there will not be enough cracking activity to keep the product hydrocarbons liquid. In general, the weight of the syngas conversion catalyst is between about 0.2 and about 2.5 times the weight of the dual functionality catalyst, depending on factors including the acidity and activity of the catalysts used, and the pressure of operation. In order to ensure that no substantial amounts of wax forms, a high ratio of zeolite to FT component is used. The weight ratio of zeolite to the FT component within the bed of the reactor is advantageously between about 5 and about 50. The reaction temperature is suitably greater than about 210° C., for example, from about 210° C. to about 230° C. Higher reaction temperatures favor lighter products. The total pressure is greater than about 5 atmospheres, for example, from about 5 to about 25 atmospheres. Higher reaction pressures favor heavier products. The gaseous hourly space velocity based upon the total amount of feed is less than about 8,000 volumes of gas per volume of catalyst per hour.

The downstream catalyst bed 8 contains a catalyst comprised of a hydrogenation component useful as an olefin saturation catalyst deposited on a support. The hydrogenation component can be a Group IB noble metal, a Group VIII noble metal, or a combination thereof. Preferred noble metals include platinum, palladium, rhodium, iridium, silver, osmium and gold, and combinations thereof, and metal combinations including ruthenium. Ruthenium is not preferred when not in combination with another metal due to its strong Fischer-Tropsch synthesis activity.

The olefin saturation catalyst can be supported on any suitable support, such as solid oxides, including but not limited to alumina, silica or titania, or mixtures thereof. This support may be a zeolite support containing silica in the tetrahedral framework positions. Examples include, but are not limited to, silica only molecular sieves such as silicalite, silica-alumina (aluminosilicates), silica-boron (borosilicates), silica-germanium (germanosilicates), aluminum-germanium, silica-gallium (gallosilicates) and silica-titania (titanosilicates), and mixtures thereof.

Figure 2:
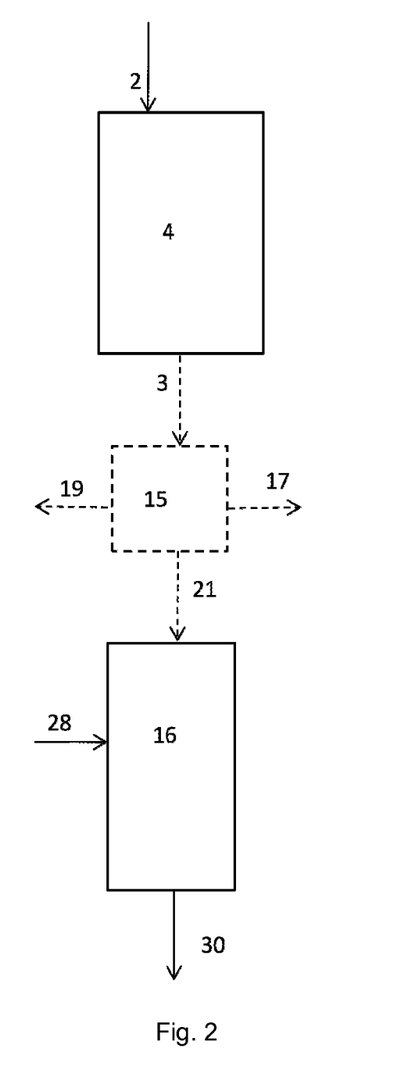
FIG. 2 is a schematic diagram illustrating a process for converting synthesis gas to liquid hydrocarbons according to another embodiment of the invention.

According to another embodiment, the upstream and downstream beds are not physically within the same reactor. FIG. 2 illustrates this embodiment, in which synthesis gas feed 2 contacts upstream catalyst bed 4 of synthesis gas conversion catalyst to form intermediate mixture 3 containing no greater than about 5 weight % C21+ normal paraffins which is subsequently directed to downstream catalyst bed 16 containing olefin saturation catalyst in a separate reactor. Hydrogen stream 28 is fed to downstream catalyst bed 16. Intermediate mixture 3 is optionally directed to separator 15, whereby water and gas can be removed. Gas stream 19 can be disposed of by any convenient means, including, but not limited to, recycling to upstream catalyst bed 4, sending to a syngas generation unit (not shown) or flaring (not shown). Water 17 is condensed and removed. Liquid hydrocarbon stream 21 is directed to downstream catalyst bed 16.

According to this embodiment, the downstream catalyst bed 16 contains an olefin saturation catalyst as previously described, including a Group IB noble metal, a Group VIII noble metal, or a combination thereof. Preferred noble metals include platinum, palladium, rhodium, iridium, silver, osmium and gold, and combinations thereof. According to this embodiment, the downstream catalyst bed 16 can also include an olefin saturation catalyst having a hydrogenation component selected from a metal or combination of Group VIII non-noble metals and Group VIB metals. Non-noble metals which can be used include molybdenum, tungsten, nickel, iron, zinc, copper, lead and cobalt. Suitable combinations of metals include at least one Group VIII metal and one Group VIB metal, e.g., nickel-molybdenum, cobalt-molybdenum, nickel-tungsten, and cobalt-tungsten. Preferred non-noble metal overall catalyst compositions contain in excess of about 5 weight percent, preferably about 5 to about 40 weight percent molybdenum and/or tungsten, and at least about 0.5, and generally about 1 to about 15 weight percent of nickel and/or cobalt determined as the corresponding oxides. The non-noble metal hydrogenation metals can be present in the olefin saturation catalyst composition as metal sulfides when such compounds are readily formed from the particular metal involved. The sulfide form of these metals may have desirable activity, selectivity and activity retention.

According to this embodiment, the pressure in the downstream catalyst bed 16 is between about 200 psig (1.4 MPa) and about 3000 psig (21 MPa), preferably between about 500 psig (3.4 MPa) and about 2000 psig (13 MPa). Temperature ranges in the downstream catalyst bed 16 are usually between about 300° F. (150° C.) and about 700° F. (370° C.), preferably between about 400° F. (205° C.) and about 500° F. (260° C.). The LHSV is usually within the range of from about 0.2 to about $2.0\,h^{-1}$, preferably 0.2 to $1.5\,h^{-1}$ and most preferably from about 0.7 to $1.0\,h^{-1}$. Hydrogen is usually supplied to the downstream catalyst bed 16 at a rate of from about 1000 SCF (28 m³) to about 10,000 SCF (280 m³) per barrel of feed. Typically the hydrogen is fed at a rate of about 3000 SCF (85 m³) per barrel of feed.

Fixed bed reactor systems have been developed for carrying out the Fischer-Tropsch reaction. Such reactors are suitable for use in the present process. For example, suitable Fischer-Tropsch reactor systems include multi-tubular fixed bed reactors the tubes of which are loaded with catalyst.

Regardless of which embodiment is practiced, i.e., that illustrated in FIG. 1 or FIG. 2, product stream 30 contains no greater than about 25 wt % olefins, even no greater than about 5 wt % olefins, even essentially no olefins. By "essentially no olefins" is meant that the product stream has a bromine number of less than about 1.

Product stream 30 ("the product") is liquid at about 0° C. The product is substantially free of solid wax by which is meant that the product is a single liquid phase at ambient conditions without the visibly cloudy presence of an insoluble solid wax phase. By "ambient conditions" is meant a temperature of 15° C. and a pressure of 1 atmosphere. The product has a cloud point as determined by ASTM D 2500-09 of 15° C. or less, even 10° C. or less, even 5° C. or less, and even as low as 2° C. The product has the following composition:

0-20, for example, 5-15 or 8-12, weight % $CH_4$;

0-20, for example, 5-15 or 8-12, weight % $C_{2-4}$;

60-95, for example, 70-90 or 76-84, weight % $C_{5+}$; and 0-5 weight % $C_{21+}$ normal paraffins.

EXAMPLES

Example 1

Preparation of Catalyst Comprising 7.5 Weight % Co-0.19 Weight % Ru Supported on 80 Weight % ZSM-12 and 20 Weight % Alumina ZSM-12 powder was first calcined at 550° C. for 2 hours. 50 g of the calcined ZSM-12 powder and 12.5 g of catapal B alumina powder was added to a mixer and mixed for 10 minutes. 30.6 g of deionized water and 0.89 g of nitric acid was added to the mixed powder and mixed for 10 minutes. The mixture was then transferred to a 1 inch BB gun extruder available from The Bonnot Company (Uniontown, Ohio) and extruded through a dieplate containing forty-eight ¹⁄₁₆ inch (0.16 cm) holes. The ZSM-12 extrudates were dried first at 70° C. for 2 h, then at 120° C. for 2 h and finally calcined in flowing air at 600° C. for 2 h.

A catalyst containing 7.5% Co-0.19% Ru on ¹⁄₁₆ inch (0.16 cm) alumina-bound ZSM-12 extrudates was prepared in a single step using non-aqueous impregnation. The ZSM-12 extrudates prepared above were used. First, 0.259 g of ruthenium(III) nitrosyl nitrate (available from Alfa Aesar) was dissolved in 4 g of deionized water. Second, 16.049 g of cobalt(II) nitrate hexahydrate (available from Sigma-Aldrich) was dissolved in 80 g of acetone. The two solutions were then mixed together and added to the 40 g of dry alumina-bound ZSM-12 extrudates. The solvent was removed in a rotary evaporator under vacuum by heating slowly to 45° C. The vacuum-dried material was then further dried in air in an oven at 120° C. overnight. The dried catalyst was then calcined at 300° C. for 2 hours in a muffle furnace. The properties of the extrudate and catalyst are set forth in Table 1.

TABLE 1

| Catalyst Composition | Micropore Area, m²/g | External Surface Area, m²/g | BET Surface Area, m²/g | Metal Dispersion, % | Average Particle Diameter, nm |
|---|---|---|---|---|---|
| 80% ZSM-12 + 20% $Al_2O_3$ | 167 | 98 | 264 | na | na |
| 7.5% Co-0.19Ru/ (80% ZSM-12 + 20% $Al_2O_3$) | 55 | 61 | 115 | 15.2 | 6.5 |

Ten grams of catalyst as prepared above was charged to a glass tube reactor. The reactor was placed in a muffle furnace with upward gas flow. The tube was purged first with nitrogen gas at ambient temperature, after which time the gas feed was changed to pure hydrogen with a flow rate of 750 sccm. The temperature to the reactor was increased to 350° C. at a rate of 1° C./minute and then held at that temperature for six hours. After this time, the gas feed was switched to nitrogen to purge the system and the unit was then cooled to ambient temperature. Then a gas mixture of 1 volume % $O_2/N_2$ was passed up through the catalyst bed at 750 sccm for 10 hours to passivate the catalyst. No heating was applied, but the oxygen chemisorption and partial oxidation exotherm caused a momentary temperature rise. After 10 hours, the gas feed was changed to pure air, the flow rate was lowered to 200 sccm and the temperature was raised to 300° C. at a rate of 1° C./minute and then kept at 300° C. for two hours. At this point, the catalyst was cooled to ambient temperature and discharged from the glass tube reactor. It was transferred to a 316-SS tube reactor of 0.51" I.D. and placed in a clam-shell furnace. The catalyst bed was flushed with a downward flow of helium for a period of two hours, after which time the gas feed was switched to pure hydrogen at a flow rate of 500 sccm. The temperature was slowly raised to 120° C. at a temperature interval of 1° C./minute, held there for a period of one hour, then raised to 250° C. at a temperature interval of 1° C./minute and held at that temperature for 10 hours. After this time, the catalyst bed was cooled to 180° C. while remaining under a flow of pure hydrogen gas. All flows were directed downward.

Example 2

Preparation of Hydrogenation Catalyst Comprising 1.0% Pd Supported on 45 Weight % SSZ-32 and 55 Weight % Alumina 1.61 g of palladium nitrate salt was dissolved in 120 cc of water. The Palladium solution was added to 120 g of the alumina (55% alumina) bound SSZ-32 zeolite. The water was removed in a rotary evaporator by heating slowly to 65° C. The vacuum-dried material was dried in air in an oven at 120° C. overnight and finally calcined at 300° C. for 2 hours in a muffle furnace.

Example 3

Synthesis Gas Conversion and Olefin Hydrogenation Using Synthesis Gas Conversion Catalyst of Example 1 and Example 2

A mixture of two grams of catalyst as described in Example 1 diluted with six grams of gamma-alumina, and 2 g of catalyst as described in Example 2 were transferred to a 316-SS tube reactor of 0.5 inch (1.27 cm) inner diameter in series with the catalyst of Example 2 placed downstream of the catalyst from Example 1 and separated by a small amount of glass wool. The reactor was then placed in a reactor furnace. The catalyst beds were flushed with a downward flow of argon for a period of two hours, after which time the gas feed was switched to pure hydrogen at a flow rate of 100 sccm. The temperature was slowly raised to 120° C. at a temperature interval of 1° C./minute, held constant for a period of one hour, then raised to 250° C. at a temperature interval of 1° C./minute and held constant for 10 hours. After this time, the catalyst beds were cooled to 180° C. while remaining under a flow of pure hydrogen gas. All flows were directed downward.

The catalysts were activated and subjected to synthesis conditions in which the catalysts and supports were contacted with feed gas of hydrogen and carbon monoxide in ratio 2.0 at temperature 220° C. with a total pressure of 10 atm and a total gas flow rate of 2100 cubic centimeters of gas per gram catalyst per hour. The results are shown in Table 2 below. The olefin concentration can be determined by bromine number. Bromine number was determined by test ASTM D 1159. At these conditions, there is <1% olefin content using the downstream olefin hydrogenation catalyst Pd/SSZ-32.

TABLE 2

| Run Conditions | | |
|---|---|---|
| Temp, ° C. | 220 | 220 |
| Pressure, atm | 10 | 10 |
| Feed | | |
| $H_2/CO$, nominal | 2 | 2 |
| $H_2/CO$, usage | 2.25 | 2.26 |
| GHSV, SL/h/g | 2.1 | 2.1 |
| Recycle Ratio | 0 | 0 |
| Results | | |
| CO conversion, % | 33.5% | 30.2% |
| $H_2$ Conv, % | 37.6% | 34.0% |
| Total conversion, % | 36.3% | 32.8% |
| Rate, $gCH_2/g/h$ | 0.15 | 0.13 |
| Products | | |
| $CH_4$, wt % | 18.1% | 18.8% |
| $C_2$, wt % | 2.3% | 2.4% |
| $C_3$-$C_4$, wt % | 12.0% | 12.7% |
| $C_{5+}$, wt % | 67.1% | 65.5% |
| $CO_2$, wt % | 0.5% | 0.5% |
| Wax, g | 0 | 0 |
| Bromine Number | <1 | 1.5 |
| Olefins/NMR | 0.55 | |

Example 4

A mixture of two grams of 2.0 g 7.5% Co/0.19Ru/ZSM-12 as described in Example 1 diluted with six grams of alpha alumina (450-850 μm), and 0.3 g 5% Pd/$Al_2O_3$ (commercially available from Alfa/Aesar, diluted with 0.9 g $Al_2O_3$) were transferred to a 316-SS tube reactor of 0.5 inch (1.27 cm) inner diameter in series with the Pd/$Al_2O_3$ catalyst placed downstream of the catalyst from Example 1 and separated by a small amount of glass wool. The reactor was then placed in a reactor furnace. The catalyst beds were flushed with a downward flow of argon for a period of two hours, after which time the gas feed was switched to pure hydrogen at a flow rate of 100 sccm. The temperature was slowly raised to 120° C. at a temperature interval of 1° C./minute, held constant for a period of one hour, then raised to 250° C. at a temperature interval of 1° C./minute and held constant for 10 hours. After this time, the catalyst beds were cooled to 180° C. while remaining under a flow of pure hydrogen gas. All flows were directed downward.

The catalysts were activated and subjected to synthesis conditions in which the catalysts and supports were contacted with feed gas of hydrogen and carbon monoxide in ratio 2.0 at temperature 220° C. with a total pressure of 10 atm and a total gas flow rate of 2100 cubic centimeters of gas per gram catalyst per hour. The results are shown in Table 3 below. At these conditions, there is a 15-18% olefin content corresponding to a bromine number of 30-37.

TABLE 3

| TOS, h | 50.67 | 74.13 | 97.17 |
|---|---|---|---|
| Run Conditions | | | |
| Temp, ° C. | 220 | 220 | 220 |
| Pressure, atm | 10 | 10 | 10 |
| Feed | | | |
| $H_2/CO$, nominal | 2.00 | 2.00 | 2.00 |
| $H_2/CO$, usage | 2.09 | 2.12 | 2.09 |
| GHSV, SL/h/g | 3.0 | 3.0 | 2.1 |
| Recycle Ratio | 0.00 | 0.00 | 0.00 |
| Results | | | |
| CO Conv, % | 44.2% | 40.0% | 50.4% |
| $H_2$ Conv, % | 46.1% | 42.3% | 52.6% |
| Total Conv, % | 45.5% | 41.5% | 51.9% |
| Rate, $gCH_2/g/h$ | 0.276 | 0.250 | 0.220 |
| Products | | | |
| $CH_4$, wt % | 11.2% | 11.6% | 12.1% |
| $C_2$, wt % | 1.1% | 1.1% | 1.2% |
| $C_3$-$C_4$, wt % | 9.6% | 10.0% | 9.8% |
| $C_{5+}$, wt % | 77.7% | 76.9% | 76.3% |
| $CO_2$, wt % | 0.5% | 0.5% | 0.7% |
| Wax, g | 0.0 | 0.0 | 0.0 |
| Bromine Number | 34 | 37 | 30 |

Comparative Example 1

Synthesis Gas Conversion with and without Recycle Using Synthesis Gas Conversion Catalyst of Example 1

A mixture of two grams of catalyst as described in Example 1 diluted with six grams of gamma-alumina was transferred to a 316-SS tube reactor of 0.5" (1.27 cm) inner diameter. The reactor was then placed in a reactor furnace. The catalyst bed were flushed with a downward flow of argon for a period of two hours, after which time the gas feed was switched to pure hydrogen at a flow rate of 100 sccm. The temperature was slowly raised to 120° C. at a temperature interval of 1° C./minute, held constant for a period of one hour, then raised to 250° C. at a temperature interval of 1° C./minute and held constant for 10 hours. After this time, the catalyst bed was cooled to 180° C. while remaining under a flow of pure hydrogen gas. All flows were directed downward.

A catalyst prepared and activated as described above was subjected to a synthesis run in which the catalyst was contacted with hydrogen and carbon monoxide in ratios between 1.2 and 2.0 at temperatures between 205° C. and 235° C., with a total pressure of 5-20 atm and a total gas flow rate of 2100-6000 cubic centimeters of gas (0° C., 1 atm) per gram of catalyst per hour. The results are shown in Table 4 below. It can be seen that without a downstream bed of olefin saturation catalyst the olefin content of the liquid product using the catalyst from Example 1 is about 48%.

TABLE 4

| TOS, h | 100 | 242 |
|---|---|---|
| Run Conditions | | |
| Temp, °C. | 220 | 220 |
| Pressure, atm | 10 | 10 |
| Feed | | |
| $H_2/CO$, nominal | 2 | 2 |
| $H_2/CO$, usage | 2.24 | 2.18 |
| GHSV, scc/h/g | 1200 | 2100 |
| Recycle Ratio | 3 | 0 |
| Results | | |
| CO conversion, % | 83.9 | 30.1 |
| $H_2$ conversion, % | 92.6 | 32.8 |
| Rate, $gCH_2/g/h$ | 0.17 | 0.13 |
| Products | | |
| $CH_4$, wt % | 10.7 | 14.5 |
| $C_2$, wt % | 1.5 | 1.5 |
| $C_3$-$C_4$, wt % | 9.8 | 8.3 |
| $C_{5+}$, wt % | 76.7 | 75.2 |
| $CO_2$, wt % | 1.3 | 0.4 |
| Wax, g | 0.0 | 0.0 |
| Bromine Number | 97 | 86 |

What is claimed is:

1. A process for converting synthesis gas to a hydrocarbon mixture comprising contacting a feed comprising a mixture of carbon monoxide and hydrogen with a synthesis gas conversion catalyst comprising a Fischer-Tropsch synthesis component and an acidic component in an upstream catalyst bed and an olefin saturation catalyst in a downstream catalyst bed, wherein an intermediate hydrocarbon mixture containing paraffins and olefins and containing no greater than about 5 wt % $C_{21+}$ normal paraffins is formed over the synthesis gas conversion catalyst, and wherein said olefins are saturated over the olefin saturation catalyst, thereby resulting in a final hydrocarbon mixture containing no greater than about 25 wt % olefins and containing no greater than about 5 wt % $C_{21+}$ normal paraffins;

wherein between the upstream catalyst bed and the downstream catalyst bed, the intermediate hydrocarbon mixture is passed through a separator and separated into gas which is recycled to the upstream catalyst bed, water which is removed and liquid hydrocarbons which are passed to the downstream catalyst bed.

2. The process of claim 1 wherein the upstream catalyst bed and the downstream catalyst bed are within a single reactor and have an essentially common reactor temperature and an essentially common reactor pressure.

3. The process of claim 1 wherein the final hydrocarbon mixture contains no greater than about 5 wt % olefins.

4. The process of claim 1 wherein the Fischer-Tropsch synthesis component further comprises a promoter selected from the group consisting of ruthenium, rhenium, platinum, palladium, gold and silver.

5. The process of claim 1 wherein the acidic component comprises a zeolite.

6. The process of claim 1 wherein the synthesis gas conversion catalyst comprises a mixture of cobalt, iron or ruthenium and an acidic component.

7. The process of claim 1 wherein the synthesis gas conversion catalyst comprises cobalt, iron and/or ruthenium on an acidic component support.

8. The process of claim 1 wherein the olefin saturation catalyst is selected from the group consisting of platinum, palladium, rhodium, iridium, silver, osmium and gold, combinations thereof, and combinations thereof which further include ruthenium.

9. The process of claim 1 wherein the olefin saturation catalyst in the downstream catalyst bed comprises a metal sulfide.

10. The process of claim 1 wherein the olefin saturation catalyst comprises a metal selected from the group consisting of iron, nickel, zinc, molybdenum, tungsten, copper, lead, cobalt, nickel-molybdenum, cobalt-molybdenum, nickel-tungsten, and cobalt-tungsten.

11. The process of claim 1 wherein the olefin saturation catalyst comprises a zeolite support.

12. The process of claim 1 wherein the final hydrocarbon mixture produced comprises:
0-20 wt % $CH_4$;
0-20 wt % $C_2$-$C_4$; and
60-95 wt % $C_{5+}$.

13. The process of claim 1 wherein the final hydrocarbon mixture is substantially free of solid wax at ambient conditions.

14. The process of claim 1 wherein the final hydrocarbon mixture has a cloud point no greater than 15° C.

* * * * *